(12) United States Patent
Dilo

(10) Patent No.: US 9,751,696 B2
(45) Date of Patent: Sep. 5, 2017

(54) DEVICE FOR A GUIDED TRANSPORT OF A CARD WEB

(71) Applicant: Oskar Dilo Maschinenfabrik KG, Eberbach (DE)

(72) Inventor: Johann Philipp Dilo, Eberbach (DE)

(73) Assignee: Oskar Dilo Maschinenfabrik KG (DE)

( * ) Notice: Subject to any disclaimer, the term of this patent is extended or adjusted under 35 U.S.C. 154(b) by 0 days.

(21) Appl. No.: 15/345,094

(22) Filed: Nov. 7, 2016

(65) Prior Publication Data

US 2017/0129710 A1    May 11, 2017

(30) Foreign Application Priority Data

Nov. 10, 2015  (EP) ..................................... 15193805

(51) Int. Cl.
*B65G 21/20*    (2006.01)
*D01G 25/00*    (2006.01)
*B65G 21/22*    (2006.01)

(52) U.S. Cl.
CPC ............. *B65G 21/22* (2013.01); *B65G 21/20* (2013.01); *D01G 25/00* (2013.01)

(58) Field of Classification Search
CPC ........ D01G 15/40; D01G 15/42; D01G 15/44; B65G 21/22; B65G 21/20; B65G 21/2045; B65G 21/209
See application file for complete search history.

(56) References Cited

U.S. PATENT DOCUMENTS

| | | | | |
|---|---|---|---|---|
| 2008/0196207 A1* | 8/2008 | Dilo | ....................... | D01G 25/00 19/163 |
| 2008/0235915 A1* | 10/2008 | Dilo | ....................... | D01G 25/00 19/296 |
| 2008/0256756 A1* | 10/2008 | Dilo | ....................... | D01G 25/00 19/105 |
| 2012/0180264 A1* | 7/2012 | Dilo | ......................... | D04H 1/74 19/296 |

FOREIGN PATENT DOCUMENTS

| | | | | |
|---|---|---|---|---|
| EP | 1367165 A1 | 12/2003 | | |
| EP | 1947223 A1 | 7/2008 | | |
| FR | EP 1367166 A1 * | 12/2003 | ............... | D04H 1/74 |
| JP | S4711584 Y1 | 4/1972 | | |
| TW | 509734 B | 11/2002 | | |

\* cited by examiner

*Primary Examiner* — Mark A Deuble
(74) *Attorney, Agent, or Firm* — Jansson Munger McKinley & Kirby Ltd.

(57) ABSTRACT

The device for the guided transport of a card web comprises a card web transport having an endless outside surface for conveying the card web in a conveying direction, and a guide element, which is arranged opposite a section of the outside surface of the card web transport and facing the outside surface of the card web transport, has a surface profile which comprises a plurality of elevations and depressions alternating in a direction transverse to the conveying direction. The elevations and depressions extend in the conveying direction of the card web. The elevations form guide surfaces for the guidance of the card web and the depressions form vent grooves for conducting away the entrained air carried along by the card web. The guide element is concavely curved in the conveying direction, and the elevations point radially inward.

16 Claims, 6 Drawing Sheets

DEVICE FOR A GUIDED TRANSPORT OF A CARD WEB

CROSS REFERENCE TO RELATED APPLICATION

This application claims priority based on European patent application EP 15 193 805.7 filed Nov. 10, 2015. The entire disclosure and contents of this application is incorporated by reference into the present application.

FIELD

The invention relates to a device for the guided transport of a card web, and more particularly, to a device for the guided transport of a card web for the production of non-wovens.

BACKGROUND

The transport of card webs for the production of nonwovens proceeds from the carding machine, in which the card web of material fibers is produced, to the crosslapper, in which several layers of the card web are laid to form a thicker nonwoven. Over the entire transport distance of the card web from the carding machine to the point where the card web is laid in the crosslapper, the problem occurs that the conveyor belts for the card web, because of their high speed, carry along entrained air. When the card web is deflected around deflection rollers or when two conveyor belts are brought together, this air leads to the formation of a bubble. The air escapes laterally and causes the belts to flutter and the card web to be blown about. It can also lead to breaks in the card web and to stretchings or expansions of the card web. Generally, one can say that this air leads to inhomogeneities in the card web. When the card web is deflected around deflection rollers, the centrifugal forces which develop lead additionally to a lengthening of the card web, which also brings with it the danger of the formation of "bags" or folds.

It is known from EP 1 367 166 B1 that, to get rid of the entrained air in a section of the transport path where the card web undergoes a change of direction, a specifically configured guide element can be arranged. The known guide element has a surface which is curved to conform to the course of the transport path. A plurality of radial through-openings is formed in the guide element, and the entrained air is discharged radially through these openings. All of the configurations described in EP 1 367 166 B1, however, are mechanically complicated and maintenance-intensive.

It is an object of the present invention to provide a device for the guided transport of a card web which guarantees with little effort the trouble-free guidance of the card web even at high speeds and which prevents entrained air from exerting any negative effects on the card web

SUMMARY

According to an aspect of the invention, the device for the guided transport of a card web comprises a card web transport having an endless outside surface for conveying the card web in a conveying direction, and a guide element, which is arranged opposite a section of the outside surface of the card web transport and, facing the outside surface of the card web transport, has a surface profile which comprises a plurality of elevations and depressions alternating in a direction transverse to the conveying direction. The elevations and depressions extend in the conveying direction of the card web. The elevations form guide surfaces for the guidance of the card web, and the depressions form vent grooves for conducting away the entrained air carried along by the card web. The guide element is concavely curved in the conveying direction, and the elevations point radially inward.

Preferably, the elevations make possible the effective guidance of the card web in the conveying direction, whereas simultaneously the entrained air is carried along in the vent grooves, also in the conveying direction, by the movement of the card web, without this air exerting any negative effect on the card web. Further, the guide surfaces of the elevations are arranged in the direction in which the centrifugal forces of the deflecting card web act, which guarantees that the card web is reliably guided in the direction of its deflection.

The elevations and depressions preferably extend in the conveying direction, parallel to each other. As a result, the entrained air in the associated vent grooves is carried along in the same direction, so that air flows directed transversely to the conveying direction are prevented.

According to another preferred embodiment, the elevations are arranged equal distances apart in a direction transverse to the conveying direction, so that, considered transversely to the conveying direction, a uniform structure of the guide surfaces for the card web is advantageously formed.

It is also preferable for the elevations and depressions to extend over the same length. The card web is therefore supported uniformly at all points along its curved path.

Another preferred embodiment is for the elevations and depressions to extend over the entire length of the guide element in the conveying direction. Thus, the vent grooves terminate exactly at the point where the guide element also ends.

A highly preferred embodiment of the previously described parallel course of the elevations and deflections in the conveying direction consists in that, in the area where the card web is deflected around a section of a roller, at least certain sections of the vent grooves proceed tangentially.

In the case that the guide surfaces formed by the elevations and the opposite section of the outside surface of the card web transport remain a uniform distance apart, a guide channel of non-varying size is defined between the guide element and the card web transport, which guide channel promotes the reliable transport of the card web.

To be able to guide card webs of different web thicknesses, a mechanism for adjusting the distance between the elevations and the outside surface of the card web transport can be provided and is highly preferable.

In one preferred embodiment, the card web transport is a conveyor belt traveling around several deflection rollers including a first deflection roller, wherein the section of the outside surface of the card web transport which is opposite the guide element is always located at the time in question in the area where it is being deflected around the first deflection roller. As a result, a card web can be deflected into a different direction as the entrained air is being carried along and then discharged, while any negative effects of centrifugal force are avoided.

A device adapted especially to the transition between an upper carriage and a laying carriage of a crosslapper configured as a horizontal cross layer is preferred and obtained by guiding the conveyor belt at an acute angle around the first deflection roller in the upper carriage. Proceeding from the first deflection roller, the conveyor belt then travels substantially horizontally, while underneath, a short distance away, a second conveyor belt extends parallel to the first conveyor belt. The guidance property of the device is thus optimized, since the curvature of the elevations corresponds to the shape of a circumferential section of the first deflection roller.

It has been found that the card web can be guided with especially good stability when the width of the guide surfaces is in the range of 0.5-10 mm, preferably of 3-8 mm.

It has also been found that an especially effective discharge of the entrained air is possible when the width of the depressions is in the range of 1-20 mm, preferably of 4-12 mm.

BRIEF DESCRIPTION OF THE DRAWINGS

The invention is explained in greater detail below with reference to the embodiments illustrated in the drawings.

DETAILED DESCRIPTION

FIGS. 1-6b illustrate various embodiments of a device for the guided transport of a card web. A first area of application of the device according to the invention for the guided transport of a card web is that of the guidance of a card web around a deflection roller so that the card web then has its top surface facing downward. This variant is used primarily in crosslappers configured as horizontal cross layers.

Figure 1:
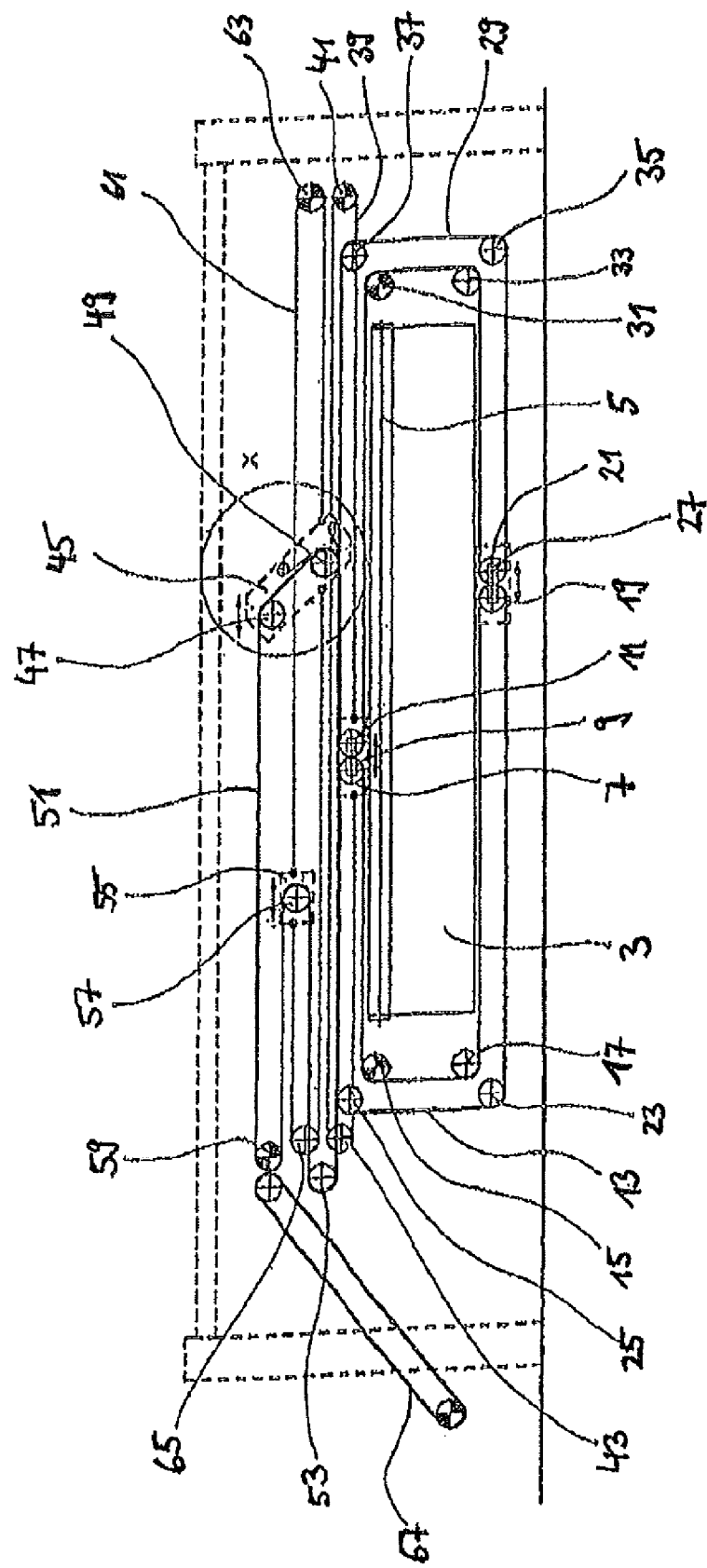
FIG. 1 shows a schematic, cross-sectional view of a crosslapper with a device according to the invention for the guided transport of a card web.

FIG. 1 shows a crosslapper of this type with an output conveyor belt 3, which has the job of conveying a laid nonwoven in a transport direction perpendicular to the plane of the drawing. The guide devices of the output conveyor belt 3 include an upper deflection roller 5. Above output conveyor belt 3, a laying carriage 7 can be moved back and forth on rails (not shown) transversely to the transport direction of output conveyor belt 3. Two freely rotatable deflection rollers 9 and 11 are supported in laying carriage 7. Deflection roller 9 is partially wrapped by a first cover belt 13, which comprises a section which runs a short distance above output conveyor belt 3 to a driven deflection roller 15 and from there, by way of another, stationary, deflection roller 17, to a deflection roller 19, which is rotatably supported in a first tension carriage 21, which can move back and forth on rails (not shown) underneath output conveyor belt 3 and transversely to it. From the deflection roller 19 supported in the tension carriage 21, the previously mentioned cover belt 13 runs over two additional, stationary, deflection rollers 23, 25 back to laying carriage 7. Driven deflection roller 15 is connected to a motor (not shown) and has the job of driving first cover belt 13 in different directions.

Because the upper run of the second cover belt 29 also serves to transport a card web 69 (see FIG. 2) into the laying nip formed between deflection rollers 9 and 11, the second cover belt 29 can also be called a "laying belt".

In similar fashion, the other deflection roller 11 rotatably supported in laying carriage 21 is partially wrapped by a second cover belt 29, which is guided over a driven deflection roller 31 and a stationary deflection roller 33 to a deflection roller 27 supported in the tension carriage 21. After cover belt 29 has wrapped partially around deflection roller 27, cover belt 29 returns via additional stationary deflection rollers 35 and 37 to laying carriage 7. Second cover belt 29 therefore comprises a section which runs very close to output conveyor belt 3. Driven deflection roller 31 is also connected to a motor (not shown) and has the job of driving second cover belt 29 in different directions.

A chain or a toothed belt 39, which runs over a drive gearwheel 41 and a deflection pulley 43 connected to a motor (not shown), is attached to laying carriage 7. These drive mechanisms are used to move laying carriage 7 back and forth above output conveyor belt 3 transversely to its transport direction.

In an elevated position relative to the height of laying carriage 7, an upper carriage 45, shown in dashed line, is supported movably on rails (not shown) in the machine stand in a direction transverse to the transport direction of output conveyor belt 3. The upper carriage 45 has an upper, second deflection roller 47 and a lower, first deflection roller 49, which are offset from each other in the direction of movement of the upper carriage 45. A card web transport 51, realized as a conveyor belt, for the card web 69 passes around the two deflection rollers 47 and 49. The conveyor belt is also called the "first conveyor belt". In the area which is bounded by the first and second deflection rollers 49, 47 in the upper carriage 45, the card web transport 51 extends downward at an angle. Proceeding from the first deflection roller 49 in the upper carriage 45, card web transport 51 runs parallel to the upper runs of two cover belts 13 and 29. Because card web transport 51, together with a section of the upper run of second cover belt 29, guides the card web 69, it can also be called a "laying belt". Card web transport 51 is guided around a deflection roller 53 supported in a stationary position in the machine stand and from there, by way of a deflection roller 57 supported in a second tension carriage 55, it proceeds to motor-driven deflection roller 59, supported in a stationary position, before returning to the upper carriage 45 again. Upper carriage 45 and the second tension carriage 55 are connected to each other by a chain or a toothed belt 61, which runs over a drive gearwheel 63 connected to a motor (not shown) and a deflection pulley 65, which are supported on the machine stand. It is also possible to see in FIG. 1 a feed apron 67, extending upward at an angle, which feeds the card web 69 to be laid to the card web transport 51.

In the area between first deflection roller 49 of the upper carriage 45 and deflection roller 11 of laying carriage 7, card web transport 51 and second cover belt 29 are guided substantially parallel to each other and only a short distance apart, so that, in the area just mentioned between upper carriage 45 and laying carriage 7, card web 69 supplied by card web transport 51 is sandwiched between card web transport 51 and second cover belt 29. Card web 69 is supported by second cover belt 29, for which reason this is also called the "second conveyor belt".

It can be seen in the drawing that, during operation, i.e., when laying carriage 7 is moving back and forth over output conveyor belt 3, first tension carriage 21 executes the opposite movement, because the lengths of the loops of cover belt 13 and 39 are constant. Upper carriage 45 and its associated second tension carriage 55 also execute opposite movements during operation, because they are connected to each other positively by the chain or the toothed belt 61. Second tension carriage 55 is necessary to keep the loop length of the card web transport 51 constant.

The present invention is used now in these types of crosslappers to guide card web 69 from card web transport 51 to second conveyor belt 29 by way of first deflection roller 49 in the upper carriage 45, around which first deflection roller 49 card web 69 is deflected.

Figure 2:
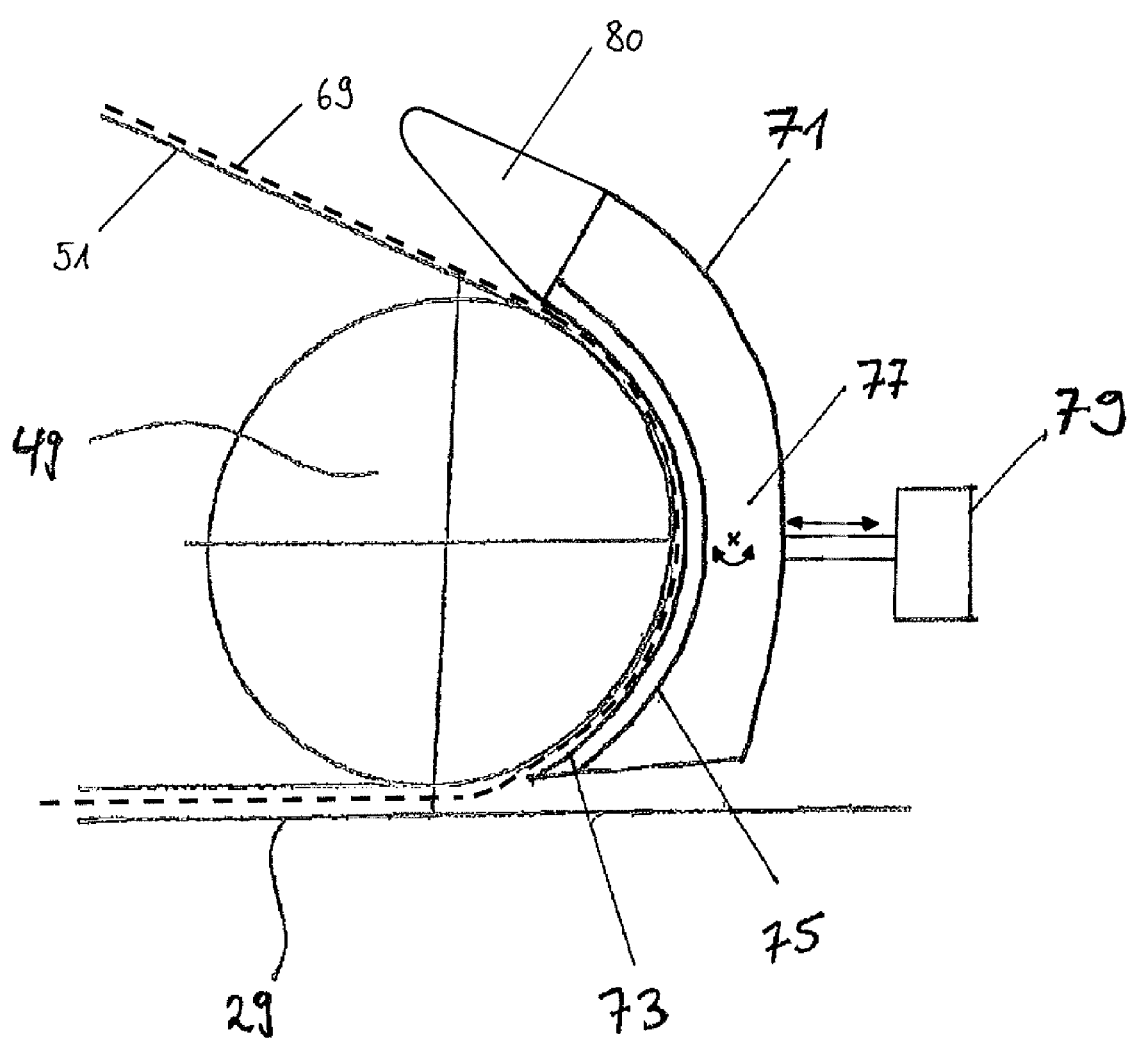
FIG. 2 shows an enlarged view of the part marked "x" in FIG. 1.

FIG. 2 shows a detailed view of the area marked "x" of the embodiment of the device according to the invention shown in FIG. 1 for the guided transport of a card web.

As previously mentioned, card web transport 51 is realized here as the first conveyor belt, the endless outside surface of which forms a contact surface for card web 69, shown in broken line. The outside surface of card web transport 51 usually has a high coefficient of friction as a result of its roughness, for example, this friction being sufficient to carry card web 69 along with it as it travels.

In addition to card web transport 51, which serves to move card web 69 forward, the device for the guided transport of the card web also comprises a guide element 71 with a plurality of curved elevations 73 spaced a certain distance apart, between which are depressions 75.

Because FIG. 2 is a cross-sectional view, only one elevation 73 can be seen, whereas the other elevations lie in front of or behind first elevation 73 relative to the plane of the drawing. Elevations 73 are preferably polished and/or coated with polytetrafluoroethylene, for example, to ensure a very low coefficient of friction.

Elevations 73 serve to the guide card web 69 in the area of first deflection roller 49 in upper carriage 45 of the crosslapper, and curvature of the elevations 73 corresponds substantially to the shape of a certain circumferential section of first deflection roller 49. The circumferential section of first deflection roller 49 which is covered by elevations 73 can preferably be somewhat smaller than half of the total circumference of first deflection roller 49 and is defined approximately by the area where card web transport 51 rests on the first deflection roller 49. Thus, between card web transport 51 resting on first deflection roller 49 and elevations 73, an area is defined in which card web 69 being carried along by card web transport 51 is deflected in a guided manner.

Simultaneously, depressions 75 between individual elevations 73 ensure that, in all cases, entrained air carried along by card web transport 51 and possibly also air escaping from card web 69 can be carried along and finally discharged. After card web 69 has traveled around first deflection roller 49, it is then laid onto the horizontally traveling section of second conveyor belt 29 and is moved along by this to laying carriage 11, during which phase it is covered from above by card web transport 51.

A mechanism 79 is also provided, by of which the distance between the elevations 73 and the opposite section of the outside surface of card web transport 51 can be adjusted. According to FIG. 2, the mechanism 79 is an actuating mechanism, which is arranged laterally next to the first deflection roller 49 in upper carriage 45. Mechanism 79 can produce displacements in the horizontal direction, as a result of which the distance from elevations 73 to card web transport 51 can be determined. Mechanism 79 can also bring about a pivoting of guide element 71. Examples of possible movements are indicated in FIG. 2 by double arrows. Finally, it is also advantageous for mechanism 79 to make possible a relatively large displacement of guide element 71 away from card web transport 51, especially during operational down times or emergency stops of the system which may become necessary because of clogging, for example. In principle, the displacement of guide element 71 should be able to give the card web channel any conceivable shape, i.e., including expansions or constrictions at desired points.

In the inlet area of guide element 71, as shown in FIG. 2, preferably an inlet guide element 80 for card web 69 is arranged, which defines a card web inlet channel preferably tapering down in the conveying direction F of card web 69. Inlet guide element 80 can be configured as an integral part of guide element 71, or it can be attached to the guide element, or it can be an independent part fastened to the machine frame. Inlet guide element 80 is preferably configured as a comb with individual fingers, so that at least some of the air contained in card web 69 can escape through the intermediate spaces between the fingers and not be able to cause the air to back up in the inlet area. In similar fashion, an outlet guide element (not shown) could also be arranged in the outlet area of guide element 71, the additional outlet guide element being preferably configured in a manner similar to that of inlet guide element 80, except that it defines a card web outlet channel which expands in the conveying direction F of card web 69.

FIGS. 3a, 3b to 6a, 6b show, respectively, a perspective view and a cross-sectional view of four embodiments of a guide element 71 of the device according to the invention. The features described above pertaining to the embodiment of FIG. 2, especially mechanism 79 for adjusting guide element 71, inlet guide element 80, and outlet guide element can also be present here, although they are not shown and are not described again.

Each of FIGS. 3a, 4a, 5a, and 6a shows a section of card web transport 51 configured as a conveyor belt, which, as shown in FIG. 2, is guided around first deflection roller 49. Card web 69 is arranged on card web transport 51, which card web 69 is shown in broken line in FIGS. 3b 4b, 5b, and 6b. Card web transport 51 moves in the deflecting direction, and card web 69 is thus conveyed by card web transport 51 in conveying direction F.

Card web transport 51 and card web 69 complete a deflection in the area of the section shown in FIGS. 3a, 4a, 5a, and 6a.

Conveying direction F, within the scope of this invention, is in principle a variable, because card web 69 is almost always following a curved path. Conveying direction F will therefore indicate different directions at different points along the path.

Figure 3A:
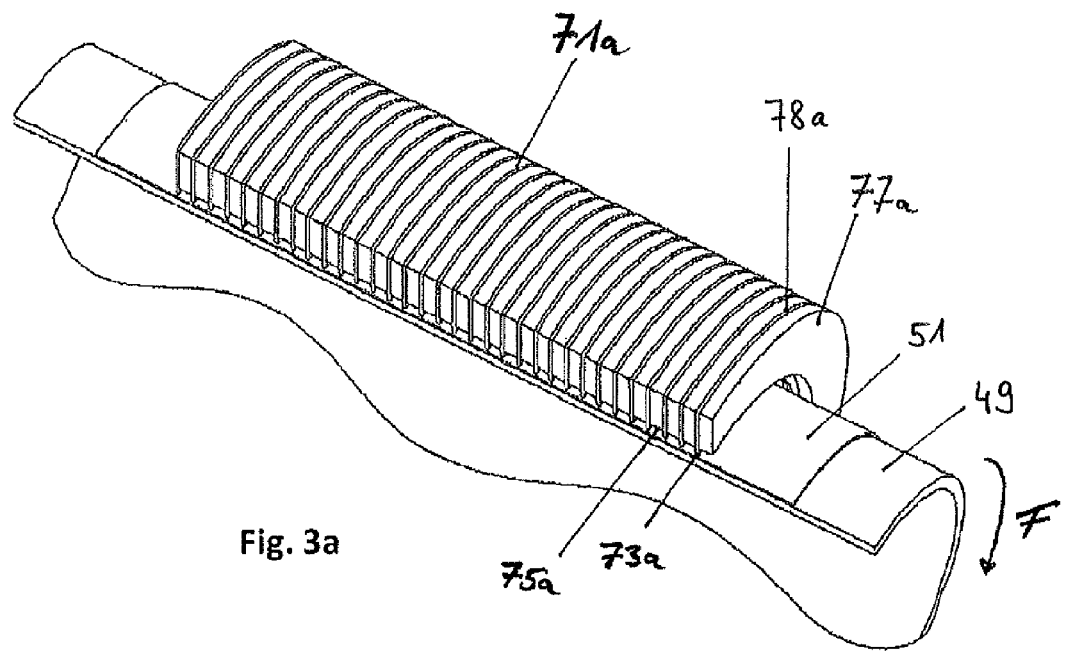
FIGS. 3a-3b are a perspective view and a cross-sectional view of a first embodiment of a guide element of the device according to the invention.
Figure 3B:
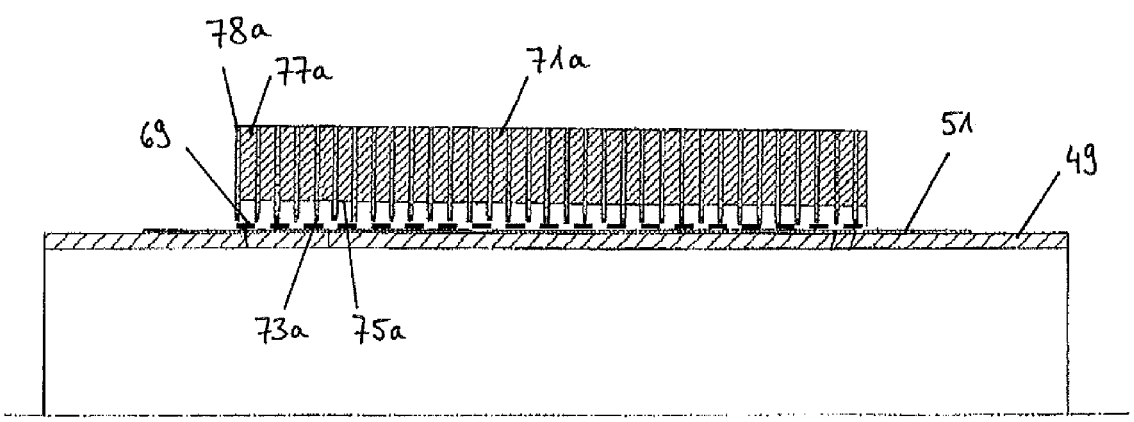

Guide element 71a shown in FIGS. 3a and 3b consists of a plurality of different plate elements alternating in the axial direction. That is, narrower plate elements 78a, which have a larger vertical dimension, alternate with wider plate elements 77a, which have a smaller vertical dimension. Plate elements 77a, 77b, which are connected to each other, thus form a guide element 71a with elevations 73a and depressions 75a, wherein narrower plate elements 78a form the elevations 73a, and wider plate elements 77a form depressions 75a. In correspondence with the width of alternating plate elements 77a, 78a, what results is elevations 73a of lesser width and depressions 75a of greater width.

Figure 4A:
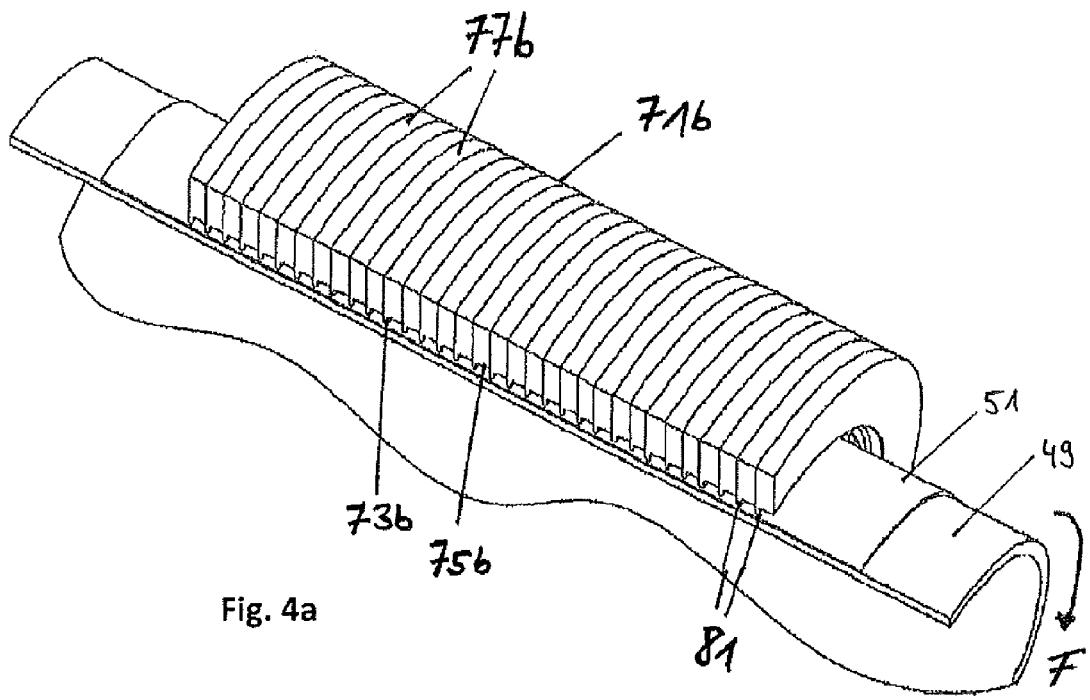
FIGS. 4a-4b are a perspective view and a cross-sectional view of a second embodiment of a guide element of the device according to the invention.
Figure 4B:
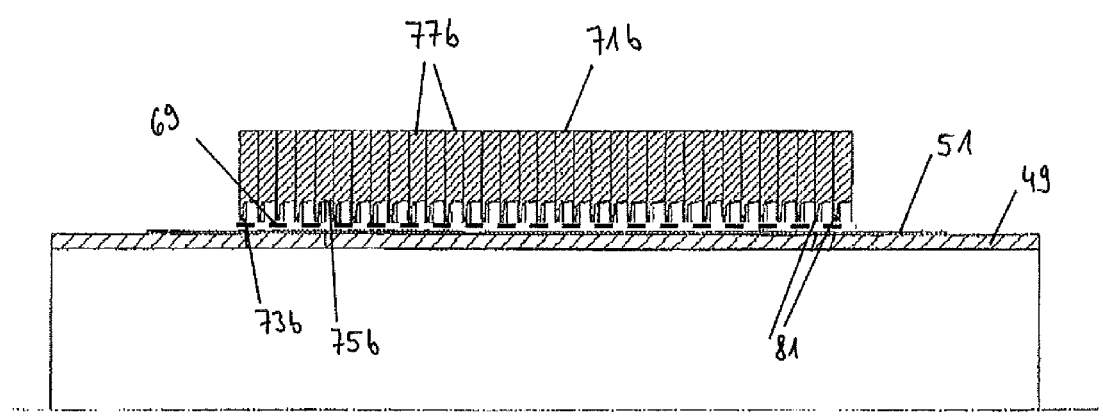

Guide element 71b shown in FIGS. 4a and 4b consists of a plurality of identical curved plate elements 77b. Each of these plate elements 77b comprises a curved projection 81 extending from the left side. In the assembled state, the surface profiles of guide elements 71a, 71b are more-or-less identical to those of FIGS. 4 and 5.

Figure 5A:
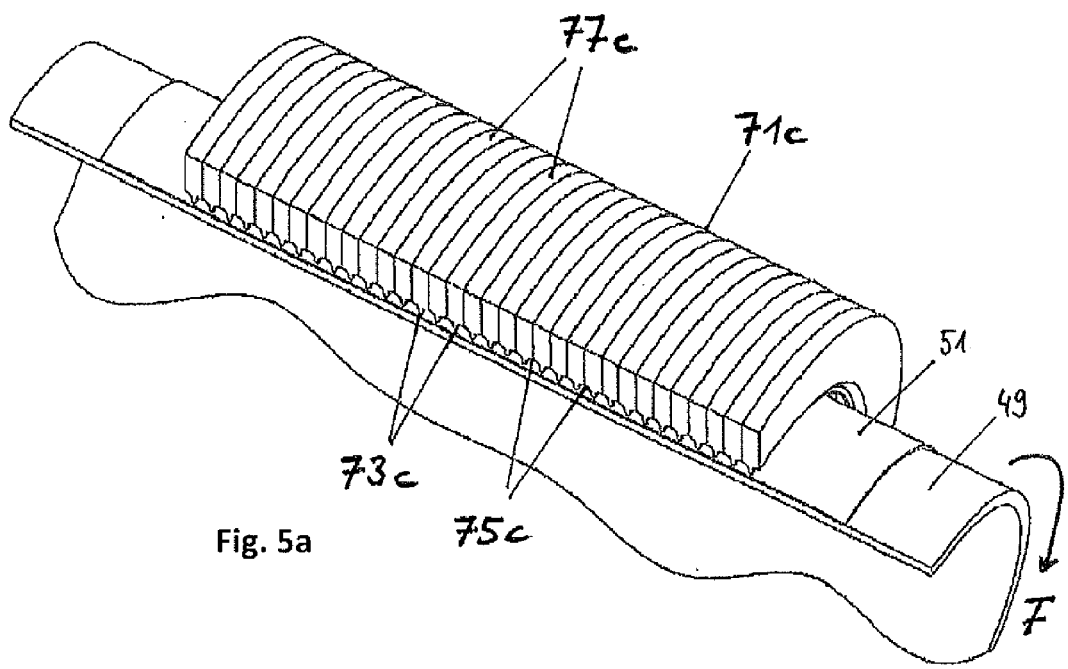
FIGS. 5a-5b are a perspective view and a cross-sectional view of a third embodiment of a guide element of the device according to the invention.
Figure 5B:
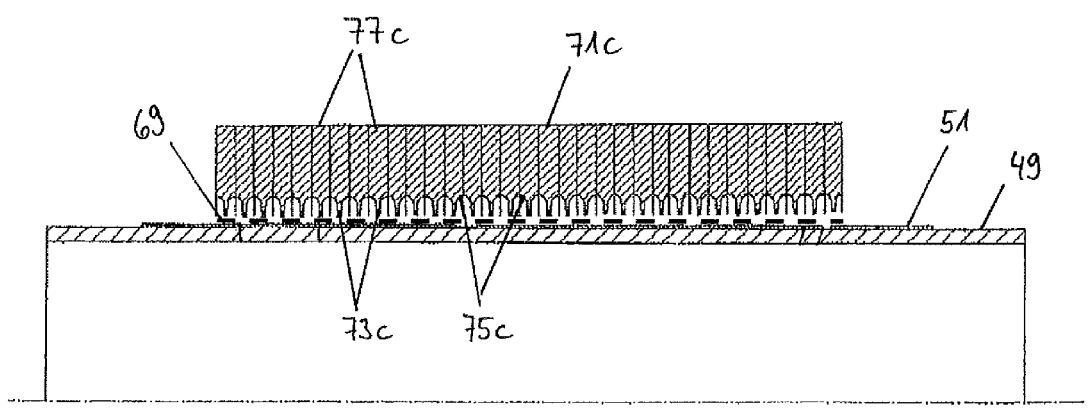

Guide element 71c shown in FIGS. 5a and 5b is also formed by a plurality of adjacent plate elements 77c. Plate elements 77c comprise centrally formed elevations 73c on the concave, narrow side, as can be seen most readily in FIG. 5b. Elevations 73c have a cross section which tapers down in the radial direction toward the guide surfaces. After plate elements 77c have been arranged next to each other, depressions 75c which form the vent grooves are defined by adjacent elevations 73c.

Figure 6A:
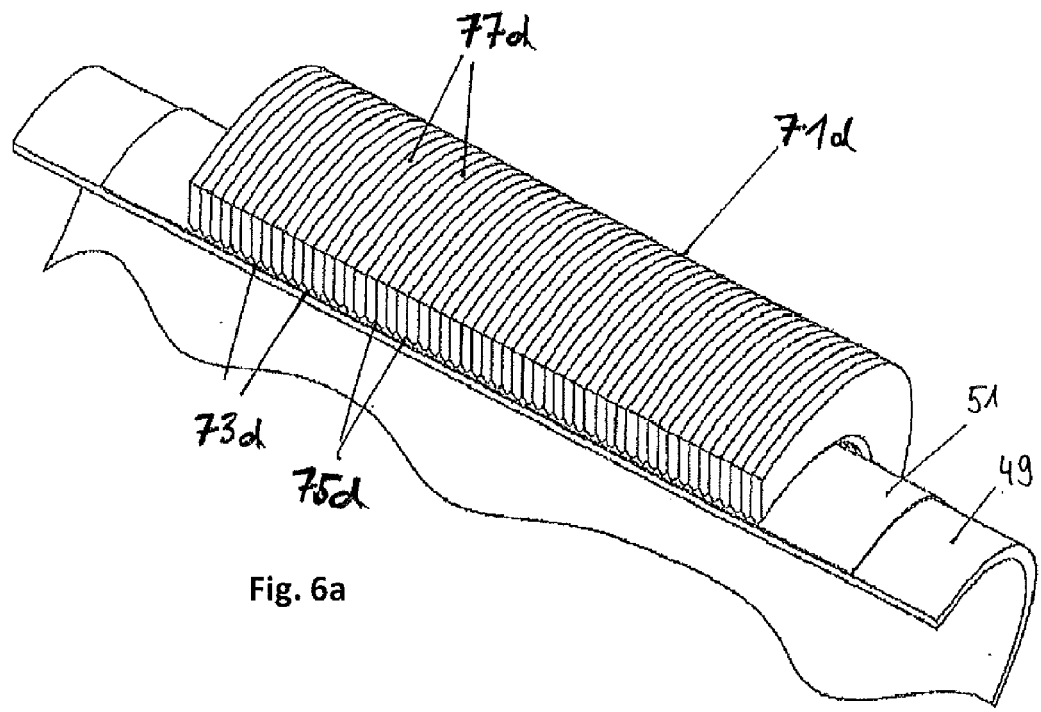
FIGS. 6a-6b are, a perspective view and a cross-sectional view of a fourth embodiment of a guide element of the device according to the invention.
Figure 6B:
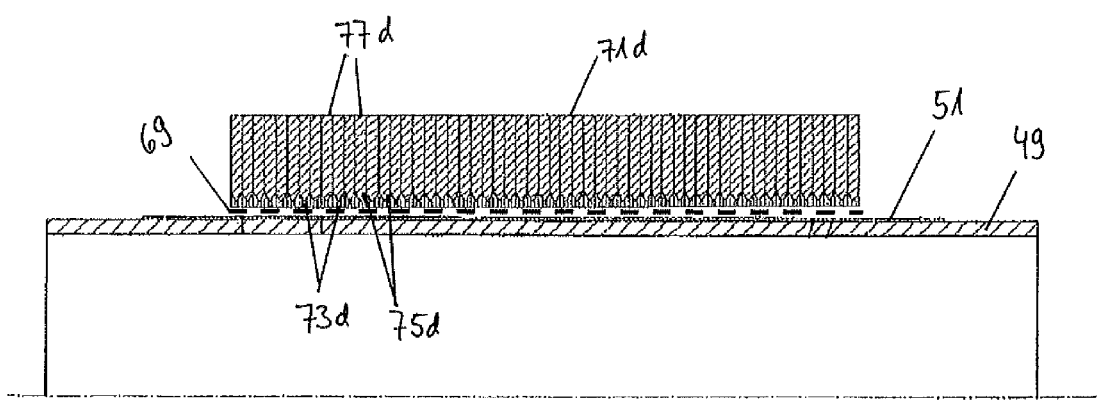

In a similar manner, guide element 71d shown in FIGS. 6a and 6b is also formed by a plurality of adjacent curved plate elements 77d. Plate elements 77d comprise centrally formed elevations 73d on the concave narrow side, as can be seen most readily in FIG. 6b. Elevations 73d have a cross section which tapers down in the radial direction toward the guide surfaces. After plate elements 77d have been arranged next to each other, depressions 75d which form the vent grooves are defined by adjacent elevations 73d.

Plate elements 77d of guide element 71d in FIG. 6b are narrower than plate elements 77c of guide element 71c in FIG. 5b. Depressions 75c of guide element 71c in FIG. 5b are not only wider but also deeper than depressions 75d of guide element 71d in FIG. 6b.

When looking at FIGS. 3-6 and comparing them with each other, it can be seen that, in the case of guide elements 71a, 71b in FIGS. 4 and 5, elevations 73a, 73b project perpendicularly, and depressions 75a, 75b have flat bottom surfaces, whereas, in the case of guide elements 71c, 71d in FIGS. 5 and 6, elevations 73c, 73d have curved or slanted sides, wherein depressions 75c, 75d have curved or acute-angled bottom surfaces.

Each guide element 71, 71a-d basically comprises a curved shape and is impermeable to air in the radial direction. The guide surfaces of guide element 71, 71a-d face card web transport 51 and card web 69 being transported on it.

As can be derived from FIGS. 3-6, each of guide elements 71a-d is preferably formed out of a plurality of plate elements 77a-d, 78a, which are connected to each other along their lateral surfaces to form concavely curved guide surfaces.

It is clear, however, that each guide element 71, 71a-d can also be made as a one-piece unit. It is possible, for example, for a curved plate to be produced with depressions, elevations, and grooves or scores by machining. Guide element 71, 71a-d can also be cast as a one-piece unit. Guide element 71a, 71a-d, however, can also be produced out of a curved base plate and web elements, which are fastened to the guide side of the base plate. Finally, it is also possible to arrange several guide segments, each of which comprises several elevations 73, 73a-d and depressions 75, 75a-d, in a row, axially next to each other, so that together they form guide element 71, 71a-d.

The shape of the curvature of the guide surfaces of guide element 71, 71a-d is to be adapted in any way desired to the shape of the path to be traveled by card web 69. In addition to a deflection of card web 69 by 180°, many other angles between the incoming and outgoing directions of card web 69 are also conceivable, including larger angles but especially smaller ones. The curvature can be convex or concave.

The shape of guide element 71, 71a-d and its distance from card web transport 51 are preferably selected as a function of the specific type of card web 69 being transported in such a way that a substantially uniform distance is obtained between elevations 73, 73a-d and the outside surface of card web transport 51. It is also possible, however, to produce intentional taperings or expansions of the card guide channel between elevations 73, 73a-d and the outside surface of card web transport 51.

The setting of the distance is preferably accomplished in such a way that card web 69 rests on the guide surfaces of guide element 71, 71a-d and simultaneously also so that contact between card web 69 and the outside surface of card web transport 51 remains present even at high centrifugal forces. At points of the card guide channel which are narrower than the thickness of the card web, card web 69 can also be slightly compressed, and thus any air still contained in it will be forced out into the vent grooves.

Elevations 73, 73a-d, however, can also be arranged so that the distance between them and the outside surface of card web transport 51 is somewhat greater than the thickness of card web 69. In this case, card web 69 does not rest on the guide surfaces of guide element 71, 71a-d until, as a result of a very high conveying speed of card web 69 and the resulting very high centrifugal force, it is lifted, so to speak, from card web transport 51 and is carried around the curve by the air stream.

In both cases, elevations 73, 73a-d of guide element 71, 71a-d produce the additional positive effect, that, as a result of their positive or non-positive contact with card web 69, they prevent an undesirable widening of card web 69 in the deflection area.

Within the scope of this description, the expression "card web" is to be understood to include not only card webs but also fiber flock mats and fleeces. The invention can be used in all possible areas of flat textile material production for the transport and deflection of the flat textile materials.

Card web transport 51 is preferably, in principle, an air-impermeable conveyor belt, but it can also be an air-permeable conveyor belt or even a deflection roller or screen roller with internal suction, around which card web 69 is wrapped directly. Several of these elements can also jointly form card web transport 51. For example, two conveyor belts can be arranged in series at an angle to each other.

A wide variety of materials are available for the various parts discussed and illustrated herein. While the principles of this device have been described in connection with specific embodiments, it should be understood clearly that these descriptions are made only by way of example and are not intended to limit the scope of the device.

I claim:

1. A device for the guided transport of a card web, the device comprising:
   a card web transport having an endless outside surface for conveying the card web in a conveying direction, and
   a guide element being arranged opposite a section of the outside surface of the card web transport and, facing the outside surface of the card web transport having a surface profile which comprises a plurality of elevations and depressions alternating in a direction transverse to the conveying direction,
   wherein the plurality of elevations and depressions extend in the conveying direction of the card web, the depressions comprise bottom surfaces between the elevations, the guide element thus being impermeable to air in the radial direction, the elevations form guide surfaces for the guidance of the card web and the depressions comprising the bottom surfaces form vent grooves for conducting away the entrained air carried along by the card web, and the guide element is concavely curved in the conveying direction and the elevations point radially inward.

2. The device of claim 1 wherein the elevations extend parallel to each other in the conveying direction.

3. The device of claim 1 wherein the elevations are arranged equal distances apart in the direction transverse to the conveying direction.

4. The device of claim 1 wherein the elevations and depressions both extend over a non-varying length.

5. The device of claim 1 wherein the elevations and depressions extend over an entire length of the guide element in the conveying direction.

6. The device of claim 1 wherein certain sections of the depressions extend tangentially.

7. The device of claim 1 wherein the guide surfaces formed by the elevations and the opposite section of the outside surface of the card web transport are at a distance from each other which remains substantially uniform.

8. The device of claim 1 further comprising a mechanism for adjusting a distance between the elevations and the opposite section of the outside surface of the card web transport.

9. The device of claim 1 wherein the card web transport is a conveyor belt traveling around several deflection rollers including a first deflection roller and the section of the outside surface of the card web transport which is opposite the guide element is located in an area where it is being deflected around the first deflection roller.

10. The device according to claim 9 wherein the card web transport is guided at an acute angle around the first deflection roller.

11. The device according to claim 1 wherein the elevations comprise a cross-sectional shape which tapers down in a radial direction toward the outside surface of the card web transport.

12. The device according to claim 1 wherein the elevations comprise a cross-sectional form with a uniform cross-sectional width.

13. The device of claim 1 wherein a width of the elevations is in the range of 0.5-10 mm.

14. The device of claim 1 wherein a width of the elevations is in the range of 3-8 mm.

15. The device of claim 1 wherein a width of the depressions is in the range of 1-20 mm.

16. The device of claim 1 wherein a width of the depressions is in the range of 4-12 mm.

* * * * *